Sept. 17, 1940.    O. C. MICKELBERG    2,215,013
PRESSURE GAUGE HAVING A CASING WITH A PROTECTIVE CLOSURE MEANS
Filed May 12, 1938
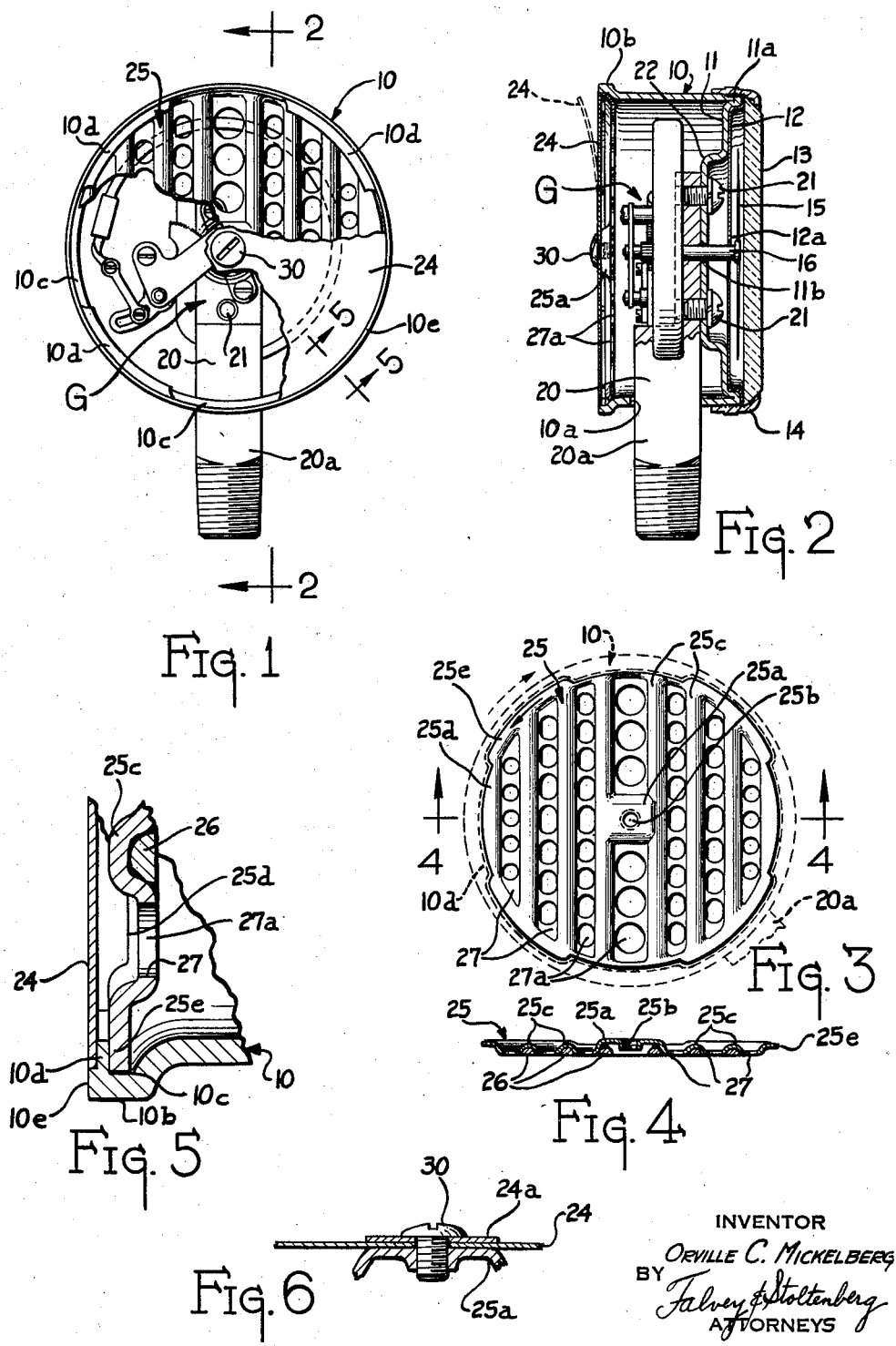
INVENTOR
ORVILLE C. MICKELBERG
BY Falvey & Stoltenberg
ATTORNEYS Patented Sept. 17, 1940

2,215,013

UNITED STATES PATENT OFFICE 2,215,013

PRESSURE GAUGE HAVING A CASING WITH A PROTECTIVE CLOSURE MEANS

Orville C. Mickelberg, La Crosse, Wis.

Application May 12, 1938, Serial No. 207,467

5 Claims. (Cl. 73—109)

This invention relates to gauges, more particularly to gauges subjected to high pressures in which there is a possibility of an explosion of the gauge case should the pressure element of the gauge rupture.

In the past, high pressure gauges have been provided with relief valves to release pressure in the gauge case should a rupture occur in the pressure element, or a flexible back has been provided which will open on spring hinges to release the pressure. These devices have, however, not been entirely satisfactory for various reasons. The relief valves often were inadequate to release the pressure beacuse in general they acted too slowly and allowed the pressure to build up so quickly that an explosion resulted. The spring-back type of construction was also unsatisfactory, in that rupture of the pressure element many times caused the loosening of operating parts on the inside of the case, which would be thrown from the case through the opening made by the releasing action of the spring-back and be projected into the surrounding space at considerable velocity to endanger persons in the immedate vicinity.

The present invention contemplates the provision of a high pressure gauge having a casing in which relatively thick protective plates are mounted in the ends of the casing, one of which is perforated and covered with a flexible plate, so that destructive pressures cannot build up within the casing to cause an explosion dangerous to persons working in the vicinity of the gauge.

The invention further contemplates the provision of a gauge casing into which a quick-acting pressure-relief means is incorporated and which has protective plates on each side of the high pressure element, at least one of which is perforated to retain all operational parts of the gauge within the casing even though some of these parts may become detached by a destructive rupture under high pressure, so that persons working in the vicinity of the gauge will be protected from elements or parts ejected at high velocity from the gauge casing in the event of such destructive rupture.

It is, therefore, a principal object of this invention to provide a casing for a gauge, particularly a high pressure gauge, in which protective plates are positioned on all sides of the pressure responsive element to protect persons working near the gauge in the event of destructive rupture of the pressure responsive element.

It is a further object of this invention to provide a casing for a gauge, particularly a high pressure gauge, in which each side of the casing is provided with a relatively heavy metallic shield, at least one of which is perforated and closed with a flexible cover, so that high pressure may be relieved with facility to prevent destructive explosion of the casing.

It is a further object of this invention to provide a casing for a gauge providing substantially equal protection from destructive rupture in every direction to persons working adjacent the gauge.

It is a further object of this invention to provide a gauge casing with a positively-acting pressure-relieving means which will protect the moving parts of the gauge from atmospheric conditions and also prevent parts loosened by destructive rupture of the pressure responsive element from being thrown from the casing.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is a rear elevational view with portions cut away to show details of construction.

Figure 2 is a sectional elevation taken along the line 2—2 of Figure 1.

Figure 3 is an elevational view of one of the parts.

Figure 4 is a sectional view taken along the line 4—4 of Figure 3.

Figure 5 is a sectional view taken along the line 5—5 of Figure 1.

Figure 6 is a sectional view of a modification.

Referring to the drawing, particularly to Figure 2, a cup-shaped casing or container 10 is provided having a relatively heavy bottom, forming a protective front wall 11 of the gauge. The front wall 11 may be of integral construction with the casing or may be separated therefrom as shown for convenience in forming operations. When separate from the casing, it is preferably sweated or soldered in position therein at the point of cooperation between a flange 11a and the inside of the container 10. Positioned on the outside of the forward wall 11 is a flanged dial 12, upon which may be formed indexes of the gauge scale. The flange of the dial cooperates with the forward edge of the container 10 and is held in position thereon by means of a glass closure plate 13 fitted inside of a flanged collar 14 which is in threaded relation with the outside of the casing 10.

In the space between the dial 12 and the glass plate 13, a pointer portion 15 is provided which cooperates with the scale formed on the dial 12 to indicate values of pressure or the like. A spindle 16 is provided for the pointer portion 15 to actuate it, the spindle extending through centrally located apertures 12a in the dial and 11b in the front wall to cooperate with a gauge mechanism G, preferably of the Bourdon type located inside of the casing. Gauges of this type are well known and need not be described in detail.

The gauge mechanism G is provided with a supporting column 20, which is attached to the front wall 11 by means of screws 21, being thereby held in position in the casing. The heads of the screws 21 are preferably located in a depression 22, formed centrally in the front wall, and covered by the dial 12 so as to be invisible through the glass 13. The column 20 is provided with a projection 20a which extends through an aperture 10a in the casing or container 10 to provide a convenient means for attaching the complete gauge to an extraneous pressure system. For convenient connection to the pressure system, the end of the projection 20a is provided with threads, the column immediately above the threads being of square cross-section to cooperate readily with manual attaching tools.

The casing or container 10 extends rearwardly of the gauge mechanism and terminates in an outwardly extending annular projection 10b which forms an internal shoulder 10c (Figure 5) and also an internally extending flange which is cut away in part to form inwardly projecting tongues 10d. The tongues are spaced from the shoulder 10c to form an annular space between them in which a perforated detachable protecting plate 25 is adapted to be fitted, the details of which are clearly shown in Figures 3 and 4. Against the outer side of the tongues 10d, a flexible plate 24 is fitted whose edge cooperates with a rim 10e, formed on the periphery of the container.

Referring to Figures 3 and 4, the detachable protective plate 25 is shown as having a central raised boss 25a with a threaded aperture 25b and having transverse strengthening corrugations 25c at selected intervals into which reinforcement bars 26 (Figure 4) are suitably attached as by soldering. The reinforcement bars 26 are preferably of solid construction, designed to stiffen the plate 25 and make it stronger to resist explosive force. The webs 27 between the corrugations 25c are perforated with apertures 27a of any convenient size but preferably relatively small, to prevent loosened parts within the casing from being projected through the apertures in event of an explosion.

The peripheral edge of the plate 25 is provided with an upturned outwardly extending flange 25d which is cut away in part to form outwardly extending tongues 25e which cooperate with the inwardly extending tongues 10d on the casing as described above. The tongues 25e are adapted to cooperate with the annular space between the inturned tongues 10d and the shoulder 10c and are brought into cooperative relation with these parts by a relative turning as illustrated in Figure 3, where the casing 10 with its tongues 10d, is shown in phantom. The final position of the parts is shown in Figures 1 and 5.

Referring again to Figure 2, the central boss 25a with its threaded aperture 25b, is provided with a screw 30 to cooperate with an aperture in the flexible plate 24 to attach the plate to the protective plate 25 and the casing 10. The flexible plate 24, referred to above, is preferably made of spring material and is given a spherical curvature which the screw 30 is adapted to flatten and thereby place a pressure upon the peripheral edge of the flexible plate where it cooperates with the casing. This pressure, created by the distorted curvature, forms a substantially weather-proof closure for the gauge casing.

The flexible plate 24, as shown in phantom in Figure 2, is adapted to flex about the central screw 30 to allow its peripheral edges to be displaced from the casing to form an opening in the casing. This peripheral opening between the flexible plate and the casing allows gas under pressure, which has accumulated within the casing, to escape to the atmosphere. The perforated protective plate 25 presents very little resistance to the flow of fluid but performs the protective function described above. After the pressure in the casing has been relieved, the spring action of the flexible plate may return it to its original position, but in many cases the violence of the rupture destroys the gauge completely, so that the gauge is unfit for further service.

Should conditions arise in which it is necessary to make adjustments to the actuating mechanism of the Bourdon tube, access may be obtained to the casing by first removing the flexible plate 24 by retracting the screw 30 from the plate 25. Then the plate 25 will be removed from its relation with the casing 10 by rotation in such direction as to release the tongues 25e from their cooperative relation with the tongues 10d on the case. When this condition obtains, the protective plate is readily removed from the casing, making the operating parts of the Bourdon gauge accessible for proper adjustment. After the adjustments are complete, the parts may be replaced in position on the casing.

Referring to Figure 6, a modification of the invention is shown in which the screw 30 is provided with a thin washer 24a to reenforce the flexible plate 24 at its central portion. The washer 24a reduces the possibility of shear of the flexible plate 24 adjacent the screw 30 when high stresses are created by a rupture. This laminated construction increases the radius of bending of the flexible plate and strengthens it adjacent the screw 30.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a casing inclosing the active elements of a gauge, a relatively heavy backing plate positioned in one side of the casing supporting the dial of the gauge, a relatively heavy plate with perforations closing another side of the casing, means to allow disengagement of the plate from the casing, a flexible plate covering the perforations to protect the inside of the casing from atmospheric conditions, and means to attach the flexible plate at a central location to the perforated plate to allow radial flexing of the flexible plate from the perforated plate to prevent pressure from building up inside of the casing.

2. In a device of the class described, a cup-shaped container, pressure responsive means mounted on the inside of the container having a pointer means cooperating therewith through an aperture in the container, removable wall means cooperating with the open side of the container having perforations therein, flexible cover means for the removable wall means to cover the perforations, and means to fasten the cover means the the removable wall means adjacent a central location of the cover means whereby the cover means may flex outwardly from the fastening means substantially equally on all sides.

3. The device defined in claim 2 in which the flexible cover means is characterized by a laminated construction adjacent the fastening means to reenforce the flexible cover means.

4. In a device of the class described, a cup-shaped container, pressure-responsive means mounted in the container having a pointer means and a connective means cooperating with apertures therein, perforated means removably cooperating with the open side of the container, said perforated means being relatively thin and provided with corrugations to stiffen the perforated means, flexible cover means for the perforated means, and means adjacent the center of the cover means to fasten the cover means to the perforated means whereby the cover means is capable of flexing along radial lines from adjacent its center.

5. In a device of the class described, a cup-shaped container, a Bourdon tube mounted in the container, perforated means cooperating with the open end of the container and adapted to be removably attached to the rim thereof, flexible imperforate cover means cooperating with the rim of the container to make the container weatherproof, fastening means for the cover means adjacent a central location cooperating with the perforated means, and reinforcing means cooperating between the fastening means and the flexible cover means to increase the stiffness of the cover means adjacent its center.

ORVILLE C. MICKELBERG.